United States Patent
Arvidsson

[11] Patent Number: 5,219,447
[45] Date of Patent: Jun. 15, 1993

[54] AXIAL BEARING SYSTEM INTENDED FOR A RADIALLY MOUNTED SHAFT

[75] Inventor: Thomas Arvidsson, Linköping, Sweden

[73] Assignee: Kvaerner Hymac Inc., Canada

[21] Appl. No.: 807,825

[22] PCT Filed: Jul. 26, 1990

[86] PCT No.: PCT/SE90/00505
§ 371 Date: Jan. 23, 1992
§ 102(e) Date: Jan. 23, 1992

[87] PCT Pub. No.: WO91/02174
PCT Pub. Date: Feb. 21, 1991

[30] Foreign Application Priority Data
Jul. 27, 1989 [SE] Sweden ................ 8902604

[51] Int. Cl.⁵ .......................... F16C 32/06
[52] U.S. Cl. .................... 384/99; 384/107; 384/121
[58] Field of Search ........... 384/99, 100, 101, 112, 384/121, 123, 124, 448, 369, 12, 303

[56] References Cited
U.S. PATENT DOCUMENTS

| 3,223,463 | 12/1965 | Porath . | |
|---|---|---|---|
| 3,391,965 | 7/1968 | Lindeboom . | |
| 4,430,011 | 2/1984 | Kun | 384/99 |
| 4,794,289 | 12/1988 | Barnaby | 384/121 X |
| 4,892,417 | 1/1990 | Spargo et al. | 384/99 |
| 4,915,510 | 4/1990 | Arvidsson | 384/99 |

FOREIGN PATENT DOCUMENTS 1625623 7/1970 Fed. Rep. of Germany .
0354897 3/1973 Sweden .

*Primary Examiner*—Thomas R. Hannon

[57] ABSTRACT

An axial bearing system is provided for a radially mounted shaft having two hydrostatic axial bearings capable of axial movement relative to a surrounding bearing housing. The bearing system comprises a flange having a pressure surface rigidly attached to the shaft at a substantially right angle. An annular chamber bearing has a surface facing towards the pressure surface which surface contains an annular groove and forms together with the pressure surface inner and outer sealing gaps to either side of the annular groove. The annular chamber bearing together with the bearing housing forms a hydraulically pressurized chamber which forces the annular chamber bearing against the pressure surface.

1 Claim, 1 Drawing Sheet

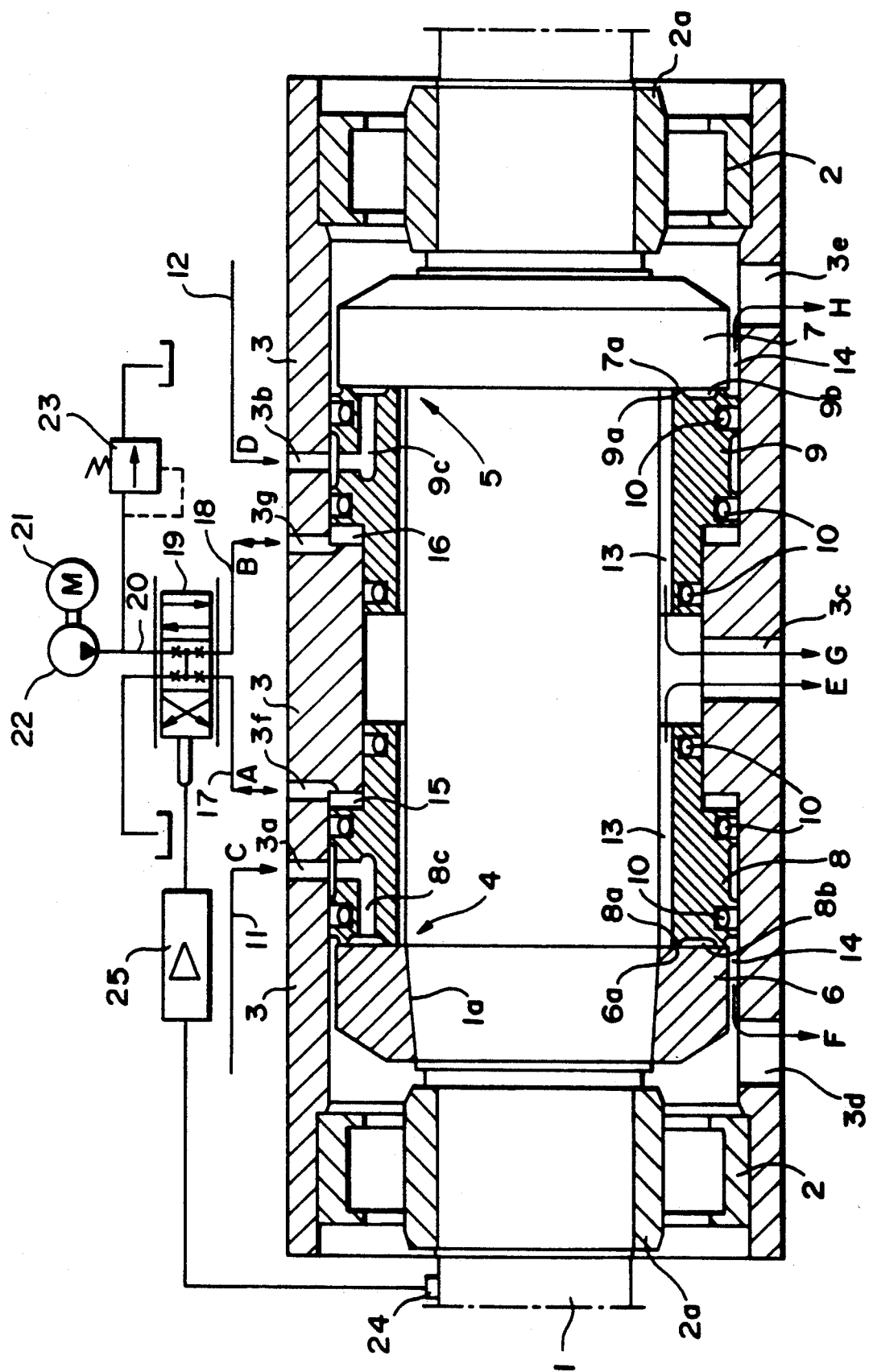

AXIAL BEARING SYSTEM INTENDED FOR A RADIALLY MOUNTED SHAFT

The present invention relates to an axial bearing system intended for a radially mounted shaft with two hydrostatic axial bearings capable of axial movement relative to a surrounding bearing housing, each comprising a flange with a pressure surface attache to the shaft, which pressure surface constitutes an essentially right angle with the shaft, an annular chamber bearing having a surface facing towards the pressure surface and in it an annular groove or a number of pockets, whereby the aforementioned surface with the pressure surface forms inner and outer sealing gaps to either side of the annular groove or the pockets and, together with the pressure surface, forms one or more chamber into which hydraulic fluid is introduced under pressure from a hydraulic fluid reservoir, which annular chamber bearing together with the bearing housing forms a hydraulically pressurized pressure chamber which forces the annular chamber bearing against the pressure surface, whereby the two annular chamber bearings are forced in mutually opposing directions, and devices, for example a servo valve, so arranged in conjunction with a sensor for monitoring the position of the shaft relative to the bearing housing as to regulate the quantity of hydraulic fluid supplied to each pressure chamber and the hydraulic pressure acting on each bearing, so as to permit the absorption of the variation in magnitude and direction of the load on the shaft, whilst retaining the possibility of the axial displacement of the same.

The need exists in many technical areas for a bearing system capable of axial adjustment which has the capacity to absorb large and varying axial forces. An example of such an area can be found in the pulp and paper industry, in which various areas of application make use of a type of axial mill in which axial forces of as much as 100 tonnes can arise, at the same time as which stringent requirements are imposed on accurate axial positional adjustment in order to achieve a precise grinding gap.

An axial bearing system of this kind is previously disclosed in PCT publication WO 88/03611, the introduction to which also contains a more detailed analysis of the requirements imposed as a general rule in respect of hydrostatic bearing system, and of other previously disclosed hydrostatic axial bearing systems.

The axial bearing system in accordance with the aforementioned PCT publication comprises a hydrostatic axial bearing on either side of a flange-like pressure-plate, which is rigidly attached to the shaft or is integral with it. In spite of the fact that the function of this previously disclosed axial bearing system is entirely satisfactory with regard to solving the tasks demanded of it, it has nevertheless emerged as being desirable to reduce the complexity of the bearing system.

The object of the present invention is to make available an axial bearing system of the kind referred to by way of introduction, which is of more simple construction and can thus be manufactured at a lower cost than previously disclosed bearing systems. This is achieved in accordance with the characterizing features of the invention in that at least one of the flanges is capable of being disassembled from the shaft, and in that the pressure surfaces face towards one another, that is to say the forces arising from the hydrostatic bearings and acting on the shaft are directed away from one another.

Also associated with the simplified structure is the fact that assembly and disassembly, for example for servicing, can be performed more rapidly and thus with sensor downtimes and less lost production than before.

The invention permits the direct transmission of power between the bearing housing and the axial bearing, that is to say it permits a smaller number of components and better concentricity than were previously achievable. Also achieved through the invention is a reduction in the length of the power flux, i.e. reduced elongation and compression of the constituent parts of the bearing, which is of considerable significance in the case of a high axial load and stringent requirements for precision. The invention also allows the axial and the radial bearings to be positioned closer to one another, which considerably reduces the risk of vibrations.

Further advantages of the invention can be appreciated from the following description, with reference to the FIGURE contained in the drawing, which in schematic form represents an axial section through an axial bearing system in accordance with the invention.

The reference designation 1 is used in the drawing in respect of a shaft, which is rotationally supported in two cylindrical radial bearings 2, installed in a bearing housing 3. The radial bearings 2 are of a conventional kink, although they exhibit extended inner rings 2a so as to permit them to absorb axial displacements in the shaft 1 relative to the bearing housing 3.

The bearing arrangement comprises two hydrostatic axial bearings 4, 5 capable of axial movement relative to the bearing housing 3. Each such axial bearing comprises a flange 6 and 7 rigidly attached to the shaft 1 and an annular chamber bearing 8 and 9. The annular chamber bearings 8, 9 are sealed against the bearing housing 3 by means of sealing rings 10. The connection between the shaft 1 and each flange is effected in this case by means of hydraulic drawing-up onto a cone of a previously disclosed kind, but can also be achieved by other previously disclosed means. Only a cone 1a is shown in the drawing.

In each axial bearing 4, 5, the flange 6 and 7 defines a pressure surface 6a and 7a which constitutes an essentially right angle with the shaft 1. An explanation of what is achieved by this means is given later. In accordance with the invention the surfaces 6a, 7a faces towards one another.

The annular chamber bearings 8, 9 exhibits a surface 8a and 9a facing towards the respective pressure surface 6a, 7a and arranged at a constant distance from it. At each and every one of these surfaces there is present an annular groove 8b and 9b which, together with the opposite pressure surface 6a and 7a, forms an annular chamber; for the sake of simplicity, these chambers have been given the same reference designations as the annular grooves 8b, 9b. The annular chamber 8b communicates via channels 8c, 3a in the annular chamber bearing 8 and in the bearing housing and via a line 11 with a hydraulic fluid reservoir, not shown in the drawing, preferably a constant flow pump. The annular chamber 9b similarly communicates via channels 9c, 3b and a line 12 with a hydraulic fluid reservoir, not shown here, also preferably a constant flow pump. The flows in the lines 11, 12 are designated C and D respectively in the drawing. As an alternative to the annular grooves 8b, 9b a number of pockets may be present in the surface 8a, 9a respectively, in a manner known per se, whereby each pocket communicates with the hydraulic fluid reservoir.

Executed to either side of the annular chamber 8b and 9b are inner and outer sealing gaps, via which the supplied hydraulic fluid is evacuated under a considerable drop in pressure, which in turn produces the necessary hydraulic pressure inside the annular chambers 8b, 9b required in order to support an axial load acting upon the shaft 1. The hydraulic fluid flows E and G flow from the inner sealing gaps via a cylinder-shaped gap 13 between the shaft 1 and the respective annular chamber bearing 8, 9 and via a channel 3c in the bearing housing 3. The hydraulic flows F and H flow in a similar fashion from the outer sealing gaps via a cylinder-shaped gap 14 between the bearing housing 3 and the flanges 6 and 7 and via channels 3d and 3e in the bearing housing 3.

Two annular chambers 15 and 16 are produced by means of a stepped increase in the diameter of the respective annular chamber bearings 8, 9 and by means of two corresponding stepped reductions in the diameter of the bearing housing 3. Via channels 3f and 3g in the bearing housing and lines 17 and 18, these chambers 15 and 16 each communicate with their own outlet from a servo valve 19, by means of which a certain hydraulic fluid pressure is maintained in the respective chamber through the hydraulic fluid flows A and B. The respective annular chamber bearing 8, 9 is caused by this pressure to come up against the corresponding pressure surface 6a and 7a. The chambers 15, 16 are sealed by means of the sealing rings 10.

The servo valve 19 is supplied via a line 20 with hydraulic fluid from a hydraulic pump 22 driven by a motor 21. A constant supply pressure to the servo valve 19 is maintained by means of a pressure-limiting valve 23 connected to the line 20.

The servo valve 19 is so arranged to be controlled by a device 24 for monitoring the axial position of the shaft 1, the output signal from which device is able via an amplifier 25 to influence the slide of the servo valve 19. Whenever an axial displacement occurs as a consequence of a change in the axial load, the slide of the servo valve 19 is actuated by the output signal from its normal position of equilibrium, and in so doing redistributes the pressure and the quantity of fluid to the respective annular chamber 15, 16 in such a way that equilibrium is re-established once more.

If, on the other hand, permanent axial displacement of the shaft 1 is required, that is to say a new position of equilibrium for the shaft, this can be achieved, for example, through the mechanical variation of the reference of the position-sensing device 24, for example by means of a stepping motor or by electrically influencing the output signal from the position-sensing device 24, for example by varying the amplification factor of the amplifier 25. As an alternative, the function of the servo valve 19 may be executed from the microprocessor-controlled devices for the regulation of the pressure and the quantity of fluid supplied to each annular chamber 15, 16. In this case the microprocessor is supplied continuously with information in respect of the axial position of the shaft 1.

I claim:

1. An axial bearing system for use with a radially mounted shaft (1) with two hydrostatic axial bearings (4, 5) capable of axial movement relative to a surrounding bearing housing (3), each comprising a flange (6, 7) with a pressure surface (6a, 7a) attached to the shaft (1), which pressure surface oriented at a substantially right angle with the shaft (1), an annular chamber bearing (8 9) having a surface (8a, 9a) facing towards the pressure surface (6a, 7a) and including an annular groove or multiple depressions (8a, 9b), whereby said surface (8a, 9a) with the pressure surface (6a, 7a) forms inner and outer sealing gaps on either side of the annular groove or depressions and, together with said groove or depressions or the pressure surface (6a, 7a), forms one or more chambers (8a, 9a) into which hydraulic fluid is introduced under pressure from a hydraulic fluid reservoir, which annular chamber bearing (8, 9) together with the bearing housing (3) forms a hydraulically pressurized pressure chamber (15, 16) which forces the annular chamber bearing (8, 9) against the pressure surface (6a, 7a) whereby the two annular chamber bearings (8, 9) are forced in mutually opposing directions, and means together with a sensor (24) for monitoring the position of the shaft (1) relative to the bearing housing (3) to regulate the quantity of hydraulic fluid supplied to each pressure chamber (15, 16) and the hydraulic pressure acting on each bearing (4, 5), to permit any variation in magnitude and direction of the load on the shaft (1) to be borne by said shaft while retaining the ability of said shaft to be axially displaced, and wherein at least one of the flanges (6, 7) can be disassembled from the shaft (1) and that the pressure surfaces (6a, 7a) face towards one another, such that the forces arising from the hydraulic bearings and acting on the shaft (1) are directed away from one another.

* * * * *

UNITED STATES PATENT AND TRADEMARK OFFICE
CERTIFICATE OF CORRECTION

PATENT NO. : 5,219,447

DATED : June 15, 1993

INVENTOR(S) : THOMAS ARVIDSSON

It is certified that error appears in the above-identified patent and that said Letters Patent is hereby corrected as shown below:

Column 4:
Claim 1, line 10 of the claim, "(8a,9b)" should read --(8b,9b)--;

line 15 of the claim, "(8a,9a)" should read --(8b,9b)--; and line 33 of the claim, "hydraulic" should read --hydrostatic--.

Signed and Sealed this

Twenty-fifth Day of January, 1994

Attest:

BRUCE LEHMAN

Attesting Officer   Commissioner of Patents and Trademarks